May 20, 1952     E. H. APPEL     2,597,218
PICKUP ARRANGEMENT FOR AGRICULTURAL LOADING MACHINES
Filed Aug. 16, 1946
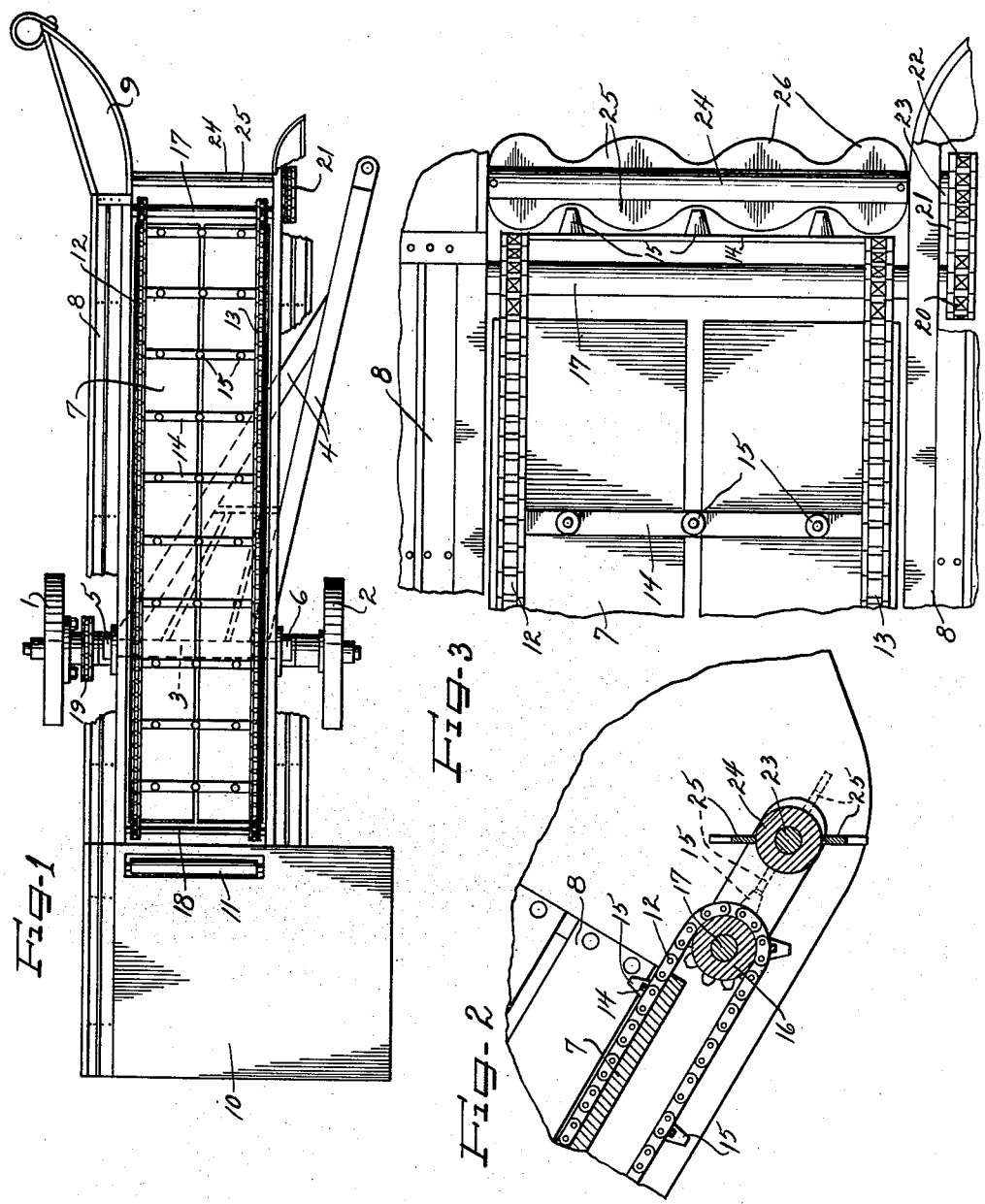
INVENTOR.
Everett H. Appel
BY
ATTYS Patented May 20, 1952

2,597,218

UNITED STATES PATENT OFFICE 2,597,218

PICK-UP ARRANGEMENT FOR AGRICULTURAL LOADING MACHINES

Everett H. Appel, Aurora, Ill.

Application August 16, 1946, Serial No. 690,884

3 Claims. (Cl. 198—9)

This invention relates to improvements in a pick-up arrangement for agricultural loading machines, and more particularly to pick-up means for use upon bale loading machines and the like, although the invention may have other uses and purposes as will be apparent to one skilled in the art.

The instant invention is an improvement upon the pick-up means embodied in the disclosure of my copending application for United States Letters Patent entitled "Agricultural Loading Machine," filed April 19, 1944, Serial No. 531,693, now issued in Patent No. 2,460,441, February 1, 1949.

In the past, many and various types of pick-up means have been utilized on agricultural loading machines, these pick-up means usually being located adjacent the leading end of the loading trough. Especially when these formerly known pick-up means were of the rotary type they frequently became fouled by having loose hay, straw, weeds, or other debris wound around them. In many cases this fouling reached such a degree that the pick-up member was not able to properly engage a load, especially if that load were relatively heavy or of the mass of a bale or the like, where a positive grip upon the load by the pick-up members is necessary. With these formerly known machines, in every instance of which I am aware there was no way of maintaining the pick-up element cleansed of such debris except by an operator periodically cleaning it. In other instances, pick-up means used in the past were objectionable in that they unduly tore or injured a load, especially a load of the type of a bale, when engaging it and when urging it upwardly onto the loading trough.

With the foregoing in mind, it is an important object of the instant invention to provide a rotary pick-up arrangement for agricultural loading machines wherein the rotary pick-up element is automatically and continuously stripped of any accumulated debris.

It is also an object of this invention to provide a pick-up arrangement for an agricultural loading machine capable of handling substantially any type of load including heavy loads of the character of bales, without tearing or otherwise injuring the load as it is being delivered to the loading trough of the machine.

Still another object of this invention is the provision in an agricultural loading machine of a pick-up element so associated with the conveying element of the machine that the conveying element automatically and continuously cleanses the pick-up element or maintains it free of any accumulated debris.

A further object of this invention is the provision in an agricultural loading machine of an elevating conveyor having spaced projections thereon, and of a rotary pick-up element having spaced projecting portions thereon, the conveyor and pick-up element being so associated that the projecting parts of one continuously interspace with the projecting parts of the other, and thus the pick-up element is continuously stripped of any accumulated debris.

Still a further object of this invention is the provision of a novel rotary pick-up member for an agricultural loading machine.

It is a further object of the invention to provide a rotary pick-up member for an agricultural loading machine having a plurality of series of blade-like elements projecting therefrom to engage a load.

Also a feature of this invention is the provision of a rotary pick-up member for an agricultural loading machine, in which the pick-up elements proper are in the form of undulated vanes.

While some of the more salient features, characteristics and advantages of the instant invention have been above pointed out, others will become apparent from the following disclosures, taken in conjunction with the accompanying drawing, in which Figure 1 is a plan view of a loading machine incorporating a pick-up arrangement embodying principles of the instant invention, with parts broken away to better illustrate structures thereneath;

Figure 2 is an enlarged fragmentary vertical sectional view, taken substantially centrally through the right hand portion of Fig. 1, illustrating the pick-up arrangement itself; and Figure 3 is an enlarged fragmentary top plan view, with parts broken away, of that portion of the machine structure illustrated in Fig. 2.

As shown on the drawings:

The illustrated embodiment of the instant invention is shown associated with an agricultural loading machine of a type highly suitable for picking up loads of the character of bales and the like. This particular machine is more fully set forth and claimed in my aforesaid copending application. It will, however, be understood that my novel pick-up arrangement may be incorporated with loading machines for use in picking up lighter loads than bales, if so desired.

In the illustrated instance the loading machine includes a pair of wheels 1 and 2 connected by a fixed axle construction 3. Associated with this axle construction is a horizontal frame arrangement 4 by means of which the entire loading machine may be connected to a wagon or other vehicle or to a power vehicle drawing a wagon beside the loading machine. Upright frame members 5 and 6 support a forwardly inclined loading trough 7 including side wings 8—8. Extending forwardly from one of the side wings at the forward end thereof is a load straightening device 9 to properly position a load that may be out of line so that it may readily be placed upon the loading trough by the pick-up arrangement to be later described.

At the upper end of the loading trough is a discharge platform 10 in the floor of which is a free running roller 11 to facilitate the depositing of a load upon the platform 10 from which it may be discharged into a wagon or other vehicle.

Operable along the loading trough 7 is an endless conveyor comprising a pair of spaced chains 12 and 13 connected at intervals by spaced transversely extending flights 14. Each of these flights 14 is provided with a plurality of spaced projections 15 to engage a load while it is carried up the loading trough by the conveyor. The chains 12 and 13 of the conveyor are engaged by suitable sprocket wheels 16 (Fig. 2) on a shaft 17 adjacent the lower end of the loading trough, and these chains also pass over suitable sprocket wheels on a shaft 18 adjacent the upper end of the loading trough. The chains may be driven in any desired manner such as by a vertical chain and sprocket connection 19 from the wheels of the vehicle. This chain and sprocket connection 19 may be associated with a transverse shaft, not visible in Fig. 1, which also may carry a sprocket or sprockets engaged with the one or both of the chains.

As seen more clearly in Fig. 3, the shaft 17 projects outwardly at one side of the loading platform and carries a sprocket 20 on its free end engaged with a chain 21 also in engagement with a sprocket wheel 22 carried on the protruding end of a shaft 23 disposed forwardly of the shaft 17. The chain 21 is so arranged that both shafts 17 and 23 are driven in the same direction. This same chain arrangement also operates these two shafts in synchronism with each other.

The shaft 23 carries the rotary pick-up member which includes a cylindrical element 24 pinned or keyed to the shaft to rotate therewith. Projecting radially out from the cylindrical member 24 is a plurality of pick-up elements proper in the form of vanes 25 having undulated edges. In the illustrated instance, two such vanes are shown and they are disposed diametrally opposite each other. The dips in the undulations of these vanes are preferably relatively deep, and may even reach the element 24 itself. The undulations are such as to define a transverse series of blade-like projecting portions 26. It is these blade-like projecting portions that engage the load to be picked up and draw the load rearwardly so that it may be in turn engaged by the projections 15 on the conveyor flights.

From the showing in Fig. 3, as well as the dotted line showing of Fig. 2, it will be especially noted that the blade-like projections 26 on the rotary pick-up member are staggered in relation to the projections 15 on the conveyor. Thus, during operation, it being recalled that the shafts 17 and 23 are driven in synchronism with each other, the conveyor projections successively interspace with the projecting portions of the rotary pick-up member. In this manner, the conveyor projections continuously strip the pick-up member of any accumulated debris. For example, in the event the pick-up member runs into loose material, such as straw, hay, weeds, or other debris, or runs in to a bulky and loosely packed bale, this loose material would be wound tightly around the pick-up member were it not for the projections 15 on the conveyor entering the spaces between the projecting portions on the pick-up member and continuously stripping it free of such debris. Were such loose debris permitted to accumulate upon the pick-up member, it would be but a short time before that member would not effectually engage a load, and especially a heavy load of the character of a bale, with a sufficient grip to elevate that load into position to be carried up the loading trough by the conveyor. It would then be necessary for the machine to be stopped and for an operator to manually strip the pick-up member of its undesirable accumulation of material.

With the instant invention, however, the pick-up element is continuously and automatically kept free of any debris so that it is always in condition to properly engage a load. It will also be especially noted that this particular pick-up member with its blade-like projecting portions 26 will not tear a load in its initial engagement, nor will it tear or otherwise injure that load while lifting the load onto the conveyor. An effectual but relatively gentle engagement of the load is provided by the blade-like projecting portions so that the load is entirely and completely picked up, but without any injury to it.

From the foregoing, it is apparent that I have provided a novel pick-up arrangement for an agricultural loading machine wherein the pick-up arrangement may be operated continuously and not acquire in accumulation of debris, will always and effectually engage a load, and will not injure the load. Furthermore, it will be noted that the pick-up arrangement is highly durable, and economical to manufacture.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an agricultural loading machine, the combination with an elevating conveyor having flights with spaced projections thereon, of a rotary pick-up member having blades with undulated edges thereon positioned relatively to said conveyor so that said projections extend into the dips of the undulations in said vanes during operation and keep the pick-up member stripped free of debris.

2. In a bale loading device, a mobile frame, an inclined loading trough carried by said frame, an endless flight conveyor operating along said trough, spaced projections on the flights of said conveyor, a rotary pick-up member adjacent the lower end of said trough, and a plurality of blades having edges of undulated shape on said pick-up member, said pick-up member being sufficiently close to said conveyor for the conveyor projections to successively enter the dips in said vanes and continuously strip the pick-up member to debris.

3. In a bale loading device, a mobile frame, an inclined loading trough carried by said frame, an endless flight conveyor operating along said trough, spaced projections on the flights of said conveyor, a rotary pick-up member adjacent the lower end of said trough, and a pair of opposed flat blades having edges of undulated shape extending from said pick-up member, said blade undulations being staggered relatively to said conveyor flight projections, said pick-up member being driven in synchronism with said conveyor as said flight projections successively pass through the dips in said vanes.

EVERETT H. APPEL.

REFERENCES CITED

The following references are of record in the file of this patent:

UNITED STATES PATENTS

| Number | Name | Date |
|---|---|---|
| 584,112 | Greenerd | June 8, 1897 |
| 1,414,201 | Pederson | Apr. 25, 1922 |
| 1,853,253 | Bennett | Apr. 12, 1932 |
| 1,911,895 | Hemscheidt | May 30, 1933 |
| 2,267,303 | Jordan | Dec. 23, 1941 |
| 2,325,704 | Passa | Aug. 3, 1943 |
| 2,402,465 | Templeton | June 18, 1946 |